(12) United States Patent
Ioffe et al.

(10) Patent No.: US 7,343,028 B2
(45) Date of Patent: Mar. 11, 2008

(54) METHOD AND APPARATUS FOR RED-EYE DETECTION

(75) Inventors: Sergey Ioffe, Mountain View, CA (US); Troy T. Chinen, Fremont, CA (US)

(73) Assignee: Fujifilm Corporation, Tokyo (JP)

( * ) Notice: Subject to any disclaimer, the term of this patent is extended or adjusted under 35 U.S.C. 154(b) by 916 days.

(21) Appl. No.: 10/440,173

(22) Filed: May 19, 2003

(65) Prior Publication Data
US 2004/0233299 A1    Nov. 25, 2004

(51) Int. Cl.
*G06K 9/00* (2006.01)
(52) U.S. Cl. .................. 382/118; 382/167; 382/190
(58) Field of Classification Search ........... 382/118, 382/117, 167, 165, 190, 275, 274, 254, 162; 348/239, 606, 207.99, 370, 576
See application file for complete search history.

(56) References Cited

U.S. PATENT DOCUMENTS

| 5,432,863 | A | 7/1995 | Benati et al. | |
|---|---|---|---|---|
| 5,819,247 | A | 10/1998 | Freund et al. | |
| 6,252,976 | B1 | 6/2001 | Schildkraut et al. | |
| 6,278,491 | B1 | 8/2001 | Wang et al. | |
| 6,665,434 | B1 * | 12/2003 | Yamaguchi | 382/162 |
| 6,829,384 | B2 * | 12/2004 | Schneiderman et al. | 382/154 |
| 6,980,691 | B2 * | 12/2005 | Nesterov et al. | 382/165 |
| 7,039,222 | B2 * | 5/2006 | Simon et al. | 382/118 |
| 7,042,505 | B1 * | 5/2006 | DeLuca | 348/241 |
| 7,082,211 | B2 * | 7/2006 | Simon et al. | 382/118 |
| 2003/0044177 | A1 | 3/2003 | Oberhardt et al. | |
| 2004/0170337 | A1 * | 9/2004 | Simon et al. | 382/254 |

OTHER PUBLICATIONS

"Robust Real-Time Object Detection" By Paul Viola, Michael Jones, Second International Workshop on Statistical and Computational Theories of Vision-Modeling, learning, Computing, and Sampling, Vancouver, Canada, Jul. 13, 2001, pp. 1-25.
"A Statistical Method for 3D Object Detection Applied to Faces and Cars" By Henry Schneiderman and Takeo Kanade, Robotics Institute Carnegie Mellon University, Jun. 13-15, 2000.
"The Boosting Approach to Machine Learing An Overview" By Robet E. Schapire, AT&T Labs—Research Shannon Laboratory, MSRI Workshop on Nonlinear Estimation and Classification, 2002, pp. 1-23.

(Continued)

*Primary Examiner*—Sheela Chawan
(74) *Attorney, Agent, or Firm*—Birch, Stewart, Kolasch & Birch, LLP

(57) ABSTRACT

A method and an apparatus automatically detect red-eye regions in a photographic image. The method according to one embodiment accesses digital image data representing a color photographic image; detects red-eye candidate regions in the photographic image by processing the digital image data, the step of detecting red-eye candidate regions including calculating feature values for multiple positions of the photographic image, and identifying red-eye candidate regions based on the calculated feature values resulting from the calculating step; and performs face detection to determine whether an identified red-eye candidate region is associated with a face.

38 Claims, 12 Drawing Sheets

OTHER PUBLICATIONS

"Experiments with a New Boosting Algorithm" By Yoav Freund and Robert E. Schapire, AT&T Research, Jan. 22, 1996, pp. 1-15.
"Logistic Regression, AdaBoost and Bregman Distances" By Michael Collins, Robert E. Schapire, Yoram Singer, Thirteenth Annual Conference on Computational Learning Theory, 2000, pp. 1-26.
Ioffe, S., "Red Eye Detection with Machine Learning," Proceedings of 2003 IEEE Int. Conf. Image Processing, vol. 2, Sep. 14, 2003, pp. 871-874, XP010670596.
Haro, A., et al., "Detecting and Tracking Eyes By Using Physiological Properties, Dynamics, and Appearance," Proceedings 2000 IEEE Conference on Computer Vision and Pattern Recognition, vol. 1 of 2, Jun. 13-15, 2000, pp. 163-168, XP001035597.
M. Celenk, "A Color Clustering Technique for Image Segmentation," Computer Vision Graphics and Image Processing, Academic Press, Duluth, MN, vol. 52, No. 2, Nov. 1, 1990, pp. 145-170.
L. Davis et al., "Terrain Typing for Real Robots," Proceedings of the Detroit, MI Intelligent Vehicles '95 Symposium, Sep. 25-26, 1995, New York, NY, IEEE, US, Sep. 25, 1995, pp. 400-405.
M. Unser et al., "A Multi-Resolution Feature Reduction Technique for Image Segmentation with Multiple Components," Proceedings of the Conference on Computer Vision and Pattern Recognition, Ann Arbor, Jun. 5-9, 1988, Washington, IEEE Comp. Soc. Press, US, Jun. 5, 1988 pp. 568-573.
M. Ollis et al., "Vision-based perception for an automated harvester," Intelligent Robots and Systems, 1997, Proceedings of the 1997 IEEE/RSJ International Conference on Grenoble, France, Sep. 7-11, 1997, New York, NY, IEEE, US, Sep. 7, 1997, pp. 1838-1844.

* cited by examiner

METHOD AND APPARATUS FOR RED-EYE DETECTION

BACKGROUND OF THE INVENTION

1. Field of the Invention

The present invention relates to a digital image processing technique, and more particularly to a method and apparatus for detecting red-eye regions in a digital image.

2. Description of the Related Art

"Red-eye" is a commonly occurring problem in flash photography, and typically occurs when the bright flash light of the camera is reflected from the blood vessels in the eye, giving the eye an unnatural red hue. Recognizing that the quality of photographs can be significantly improved if red-eyes can be fixed, research has focused on replacing red pixels with a more natural eye color once the image areas to be fixed have been indicated. If numerous images are to be processed in this manner, however, for example in a photofinishing lab, requiring an operator to examine each image and outline the red-eyes is difficult.

In view of the drawbacks of requiring operator examination of images to identify red-eye regions, image processing techniques for detecting red-eyes have been proposed. One such image processing technique, disclosed in U.S. Pat. No. 6,278,491 to Wang et al., analyzes an image to determine the location of each face in an image and, if it is determined that the detected face contains an open eye, performs further analysis to determine whether the detected open eye contains a red pupil. If so, the RGB value of each red-eye pixel is changed to a predetermined color. Despite the proposal of automatic red-eye detection techniques such as that disclosed in U.S. Pat. No. 6,278,491, the inventors of this application have found that techniques for improving detection speed and reducing the occurrence of false positives/negatives would significantly enhance the feasibility and quality of automatic red-eye detection and reduction, particularly in high volume operations such as a photofinishing lab.

SUMMARY OF THE INVENTION

The present invention is directed to a method and an apparatus for automatically detecting red-eye regions in a photographic image. According to a first aspect of the present invention, a method of automatically detecting red-eye regions in a photographic image comprises: accessing digital image data representing a color photographic image; detecting red-eye candidate regions in the photographic image by processing the digital image data, the step of detecting red-eye candidate regions including calculating feature values for multiple positions of the photographic image and identifying red-eye candidate regions based on the calculated feature values resulting from the calculating step; and performing face detection to determine whether an identified red-eye candidate region is associated with a face.

According to a second aspect of the present invention, an apparatus for automatically detecting red-eye regions in a photographic image comprises: an image data unit for providing digital image data representing a color photographic image; a red-eye candidate detecting unit for detecting red-eye candidate regions in the photographic image by processing the digital image data, the red-eye candidate detecting unit detecting red-eye candidate regions by calculating feature values for multiple positions of the photographic image, and identifying red-eye candidate regions based on the calculated feature values; and a face detection unit for performing face detection to determine whether a detected red-eye candidate region is associated with a face.

According to a third aspect of the present invention, a method of automatically detecting red-eye pixels in a photographic image comprises: accessing digital image data representing a color photographic image; normalizing each of a plurality of pixels of the digital image data based on pixels in the neighborhood of the pixel being normalized; applying a linear discriminant function to the normalized pixels; and determining whether each of a plurality of normalized pixels is a red-eye pixel or not based on the result of applying the linear discriminant function.

According to a fourth aspect of the present invention, an apparatus for automatically detecting red-eye pixels in a photographic image comprises: an image data input for providing digital image data representing a color photographic image; and a red-eye pixel detecting unit for detecting red-eye pixels by normalizing each of a plurality of pixels of the digital image data based on pixels in the neighborhood of the pixel being normalized; applying a linear discriminant function to the normalized pixels; and determining whether each of a plurality of normalized pixels is a red-eye pixel or not based on the result of applying the linear discriminant function.

BRIEF DESCRIPTION OF THE DRAWINGS

Further aspects and advantages of the present invention will become apparent upon reading the following detailed description taken in conjunction with the accompanying drawings, in which.

DETAILED DESCRIPTION

Figure 1:
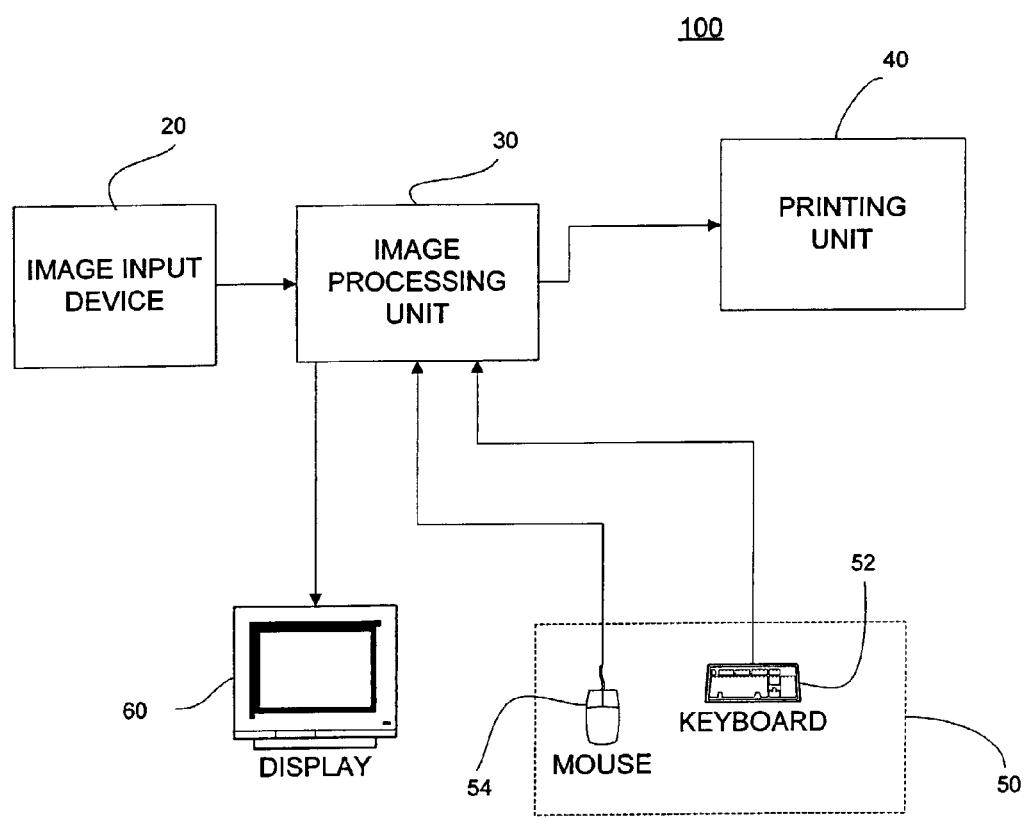
FIG. 1 is a block diagram of a system for automatic red-eye detection and correction according to an embodiment of the present invention.

Aspects of the invention are more specifically set forth in the accompanying description with reference to the appended figures. FIG. 1 illustrates a block diagram of a system for automatically detecting red-eye regions in a photographic image and for correcting red-eye regions according to an embodiment of the present invention. The system 100 illustrated in FIG. 1 includes the following components: an image input device 20; an image processing unit 30; a printing unit 40; a user input unit 50; and a display 60. Operation of and functional interaction between the components illustrated in FIG. 1 will become apparent from the following discussion.

The image input device 20 provides digital image data representing a color photograph. The image input device 20 may be a scanner for scanning images recorded on film, e.g., including CCD sensors for photoelectronically reading R (red), G (green), and B (blue) image information from film, frame by frame. The image input device 20 may be one or more of any number of devices for providing digital image data derived from photographic film or a digital camera, e.g., a recording medium (a CD-R, floppy disk, etc.) or a network connection. The image processing unit 30 receives digital image data from the image input device 20 and performs red-eye detection and reduction in a manner discussed in detail below. A user, e.g., an operator at a photofinishing lab, may view outputs of image processing unit 30, including intermediate results of red-eye detection, via display 60 and may input commands to the image processing unit 30 via the user input device 50. In the embodiment illustrated in FIG. 1, the user input includes a keyboard 52 and a mouse 54. In addition to performing red-eye detection/reduction in accordance with embodiments of the present invention, the image processing unit 30 may perform additional image processing functions, such as known color/density correction functions, as well as image cropping, compression, etc. in accordance with commands received from the user input device 50. The printing unit 40 receives the output of the image processing unit 30 and generates a hard copy of the processed image data. In the environment of a photofinishing lab, the printing unit 40 may expose a light-sensitive material according to image data output by the image processing unit 30 to record an image on the light-sensitive material. The printing unit 40 may take on other forms, such as a color laser printer. In addition or as an alternative to generating a hard copy of the output of the image processing unit 30, the processed image data may be returned to the customer as an image file, e.g., via a portable recording medium or via a network (not shown).

Figure 2:
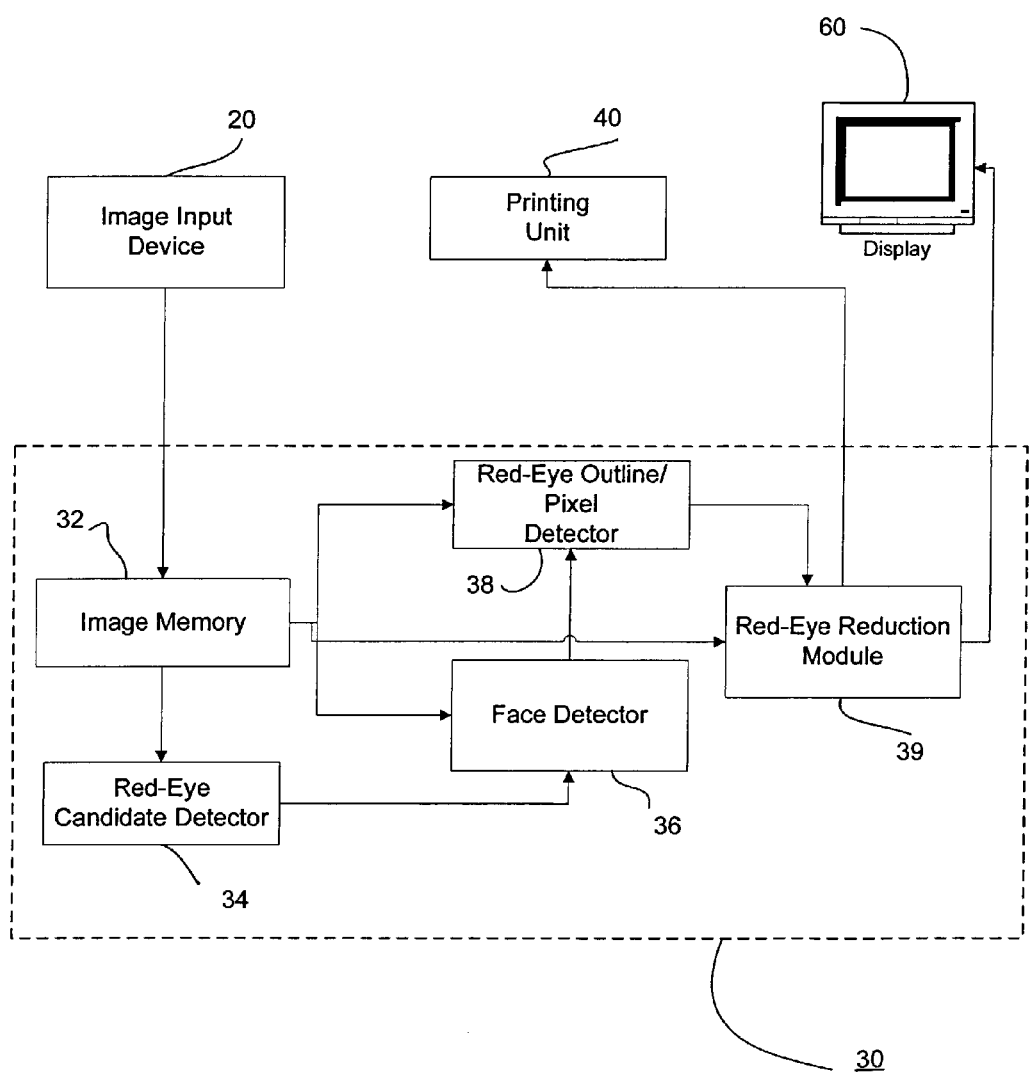
FIG. 2 is a block diagram illustrating in more detail aspects of the image processing unit of the system illustrated in FIG. 1 according to an embodiment of the present invention.

FIG. 2 illustrates details of the image processing unit 30 for performing red-eye detection and reduction according to a first embodiment of the present invention. As shown in FIG. 2, the image processing unit 30 according to this embodiment includes: an image memory 32, which receives digital image data from the image input device 20; a red-eye candidate detector 34; a face detector 36; a red-eye outline/pixel detector 38; and a red-eye reduction module 39. Although the various components of FIG. 2 are illustrated as discrete elements, such an illustration is for ease of explanation and it should be recognized that certain operations of the various components may be performed by the same physical device, e.g., by one or more microprocessors. Generally, the arrangement of elements for the image processing unit 30 illustrated in FIG. 2 performs red-eye candidate detection to find red-eye-like candidate image patches and face detection to eliminate false positives (i.e., image regions that look like possible red-eyes, but are not); and a red-eye outline/pixel detector that determines the red-eye outline and red-eye pixels within such an outline. Operation of the components of the image processing unit 30 illustrated in FIG. 2 will next be described with reference to FIGS. 3-9.

Figure 3A:
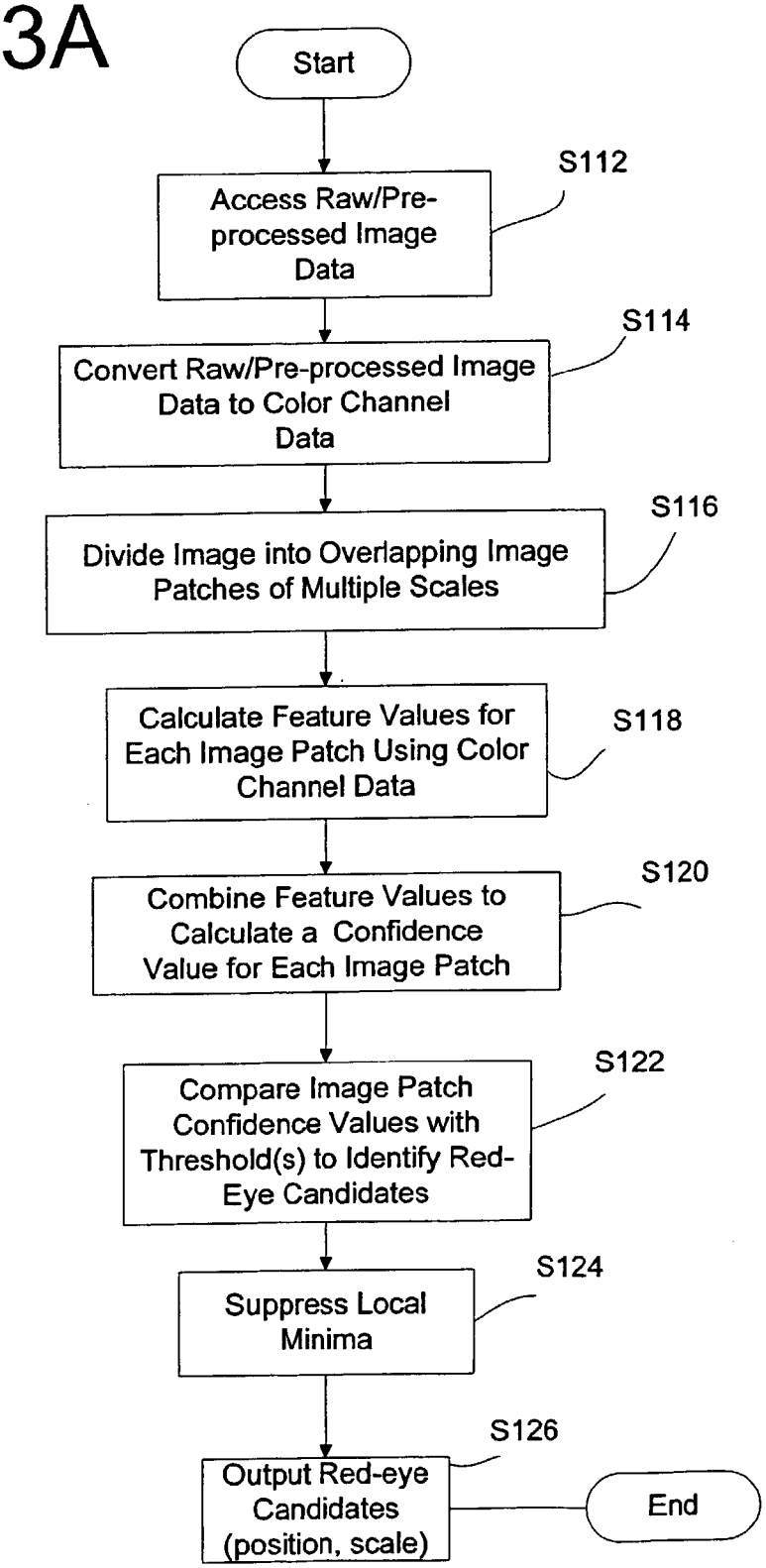
FIG. 3A is a flow diagram illustrating operations performed by a red-eye candidate detection unit to detect the position of red-eye candidate regions according to an embodiment of the present invention.

FIG. 3A is a flow diagram illustrating operations performed by the red-eye candidate detector 34 in accordance with an embodiment of the present invention. Initially, the red-eye candidate detector 34 accesses digital image data from the image memory 32 for the image being considered (S112). The image data received by the red-eye candidate detector 34 may be pre-processed, for example using local luminance equalization to enhance red-eye detection. Such local luminance equalization may be performed by normalizing each pixel using the average luminance for a rectangular (or some other shape) neighborhood around the pixel being normalized, for example by subtracting the average local luminance from the pixel being normalized or dividing the pixel being normalized by the average local luminance. Alternatively, known techniques for luminance adjustment can be applied. When the image data received from the image memory 32 is R, G, B data, the red-eye candidate detector 34 performs color conversion to the YCbCr color space, which captures the illuminance, blueness, and redness measurements of each pixel (S114). Recognizing that the skin surrounding a red-eye often appears somewhat red or pink, an embodiment of the present application also uses an additional color channel, Cr*, that facilitates discrimination between red-eye and surrounding skin pixels. Such an auxiliary color channel is described in detail below with reference to the second embodiment of the present application. Furthermore, the input image data (e.g., 1200×1800 pixels) may be size adjusted (e.g., to 900×1350 pixels) to increase speed, more specifically so that the red-eye candidate detector 34 will not look for red-eyes that are too small.

To detect red-eye candidate regions in the image data, the red-eye candidate detector 34 divides the image into overlapping image patches of fixed size (e.g., 11×11 pixels) and multiple scales of such a fixed size (e.g., scaled by a factor of 2, 4, 8 . . . ) (S116), and calculates feature values for each image patch using the YCbCrCr* color channels. Scaling is performed since red-eyes may appear in a variety of sizes. Each calculated feature value uses pixel values from a particular color channel or a combination of color channels. For example, each feature value may be calculated by taking an average value of a color channel over a rectangular region (e.g., an entire 11×11 image patch or a sub-region of the patch), or by calculating a difference of such averages in two separate rectangular areas. It should be recognized that hundreds or even thousands of different feature values are possible. The red-eye candidate detector 34 determines whether a particular image patch represents a red-eye candidate by combining calculated feature values, thereby obtaining a classifier response ("confidence value") (S120), which is compared to a threshold value to either accept/ reject the corresponding image patch as a red-eye candidate (S122). The feature values may be quantized (e.g., into 64 levels) and the threshold for accepting/rejecting red-eye candidates may be based on a histogram generated during a "learning" process (discussed in greater detail below). Having determined an initial set of red-eye candidate regions, the red-eye candidate detector 34 may perform post-processing, such as non-maximum suppression (i.e., keeping only local maximum of the classifier response) (S124) and outputs the position and scale of the remaining red-eye candidates (S126).

To accelerate the process performed by the red-eye candidate detector 34, early rejection may be implemented, calculating intermediate classifier response values that are compared to intermediate thresholds, thereby allowing the system to quickly eliminate image patches as not corresponding to red-eye regions. This early rejection technique may prevent the occurrence of false negatives by using a training technique discussed below.

Red-eyes are, essentially, small red circular blobs, but accurately and quickly identifying red-eyes presents challenges. Furthermore, if a red-eye detector is designed by hand, it is difficult to ensure that the detector is robust or applicable to many types of red-eye. One implementation of the present invention chooses the alternative: learning the detector automatically from data. In particular, sufficient quantities of (positive) example images of red-eyes, and (negative) examples of non-red-eye images are gathered. The training examples may be normalized to have a fixed size (re-scaling the red-eyes as necessary). Next, machine learning methods can be applied to train the classifier to distinguish between positive and negative data. Such a classifier looks at an image patch of a fixed size (e.g., 11×11 pixels) and determines whether or not it represents a red-eye.

Boosting is a family of learning algorithms that produces a classifier that is a weighted combination of very simple, "weak" classifiers. Any boosting algorithm takes a set of positive and negative examples and learns a classifier that outputs a function f(X), which should be positive for positive examples X and negative for negative examples. In boosting, this function is represented as:

$$f(X)=f_1(X)+f_2(X)+, \qquad \text{(equation 1)}$$

where each $f_k(X)$ is a weak classifier. Training the classifier, for a set of positive and negative examples, is an iterative process where the weak classifiers $f_i$ are learned in a sequence, and the weights of the training examples are updated so that they are higher for the examples that are more difficult, i.e., those which are misclassified by the combination of the weak classifiers learned so far.

A method such as described in Collins et al., "Logistic regression, adaboost and bregman distances," in *Computational Learning Theory*, 2000, pp. 158-169, may be used to maximize the objective function:

$$\Phi = \prod_{i=1}^{N} \left(1 + e^{-y^i f(X^i)}\right)^{-1} \qquad \text{(equation 2)}$$

where $X^1 \ldots X^N$ are the training examples, and $y^i$ are the labels (1 for positive examples, −1 for negative ones). One can verify that this objective function is maximized when, for all examples, $f(X^i)$ is high in magnitude and of the same sign as $y^i$—but this is impossible in practice because, for the classifier to generalize, the complexity of f(X) must be constrained. To optimize the objective function, the weights of the training examples are updated after each iteration, so that, when training the (i+1)th weak classifier $f_{i+1}$, a training example $X=(X_1, \ldots, X_K)$ with label y=±1 receives the weight:

$$\frac{1}{1+e^{yf(X)}}. \qquad \text{(equation 3)}$$

The image features used for red-eye and face detection (described below) can take on a finite number of values, and it is natural to consider weak classifiers that look at a single feature. For a specific feature $X_k$, the probabilities of observing each value $x_k$ in an object of interest $P(X_k=x_k|y=1)$: and in a random image of a background $P(X_k=x_k|y=-1)$ can be learned. Each distribution is learned from a set of weighted examples and is represented with a histogram—with a bin for each feature value x. It can be shown that, to maximize the objective function, the classifier that looks at the feature $X_k$ must output:

$$f_{i+1}(X) = f_{i+1}(X_k) = \frac{1}{2}\log\frac{P(X_k=x_k|y=+1)}{P(X_k=x_k|y=-1)}. \qquad \text{(equation 4)}$$

At each iteration of the training procedure, each possible feature is tried, the corresponding weak classifier is computed, the resulting value of the objective function Φ is evaluated, and the feature for which Φ is the highest is selected.

The red-eye detector 34 should have a very low false positive rate, since each photograph will contain a huge number of potential faces or red-eyes, at different positions and scales. Thus, it is preferable to have a large set of representative negative examples. However, the same set of training examples do not have to be used at all iterations of training. Instead, bootstrapping may be applied: after every few weak classifiers, the current state of the detector is known, which is applied to background images and the patterns falsely classified as positive are extracted. These false positives become the negative training set for the next several training iterations.

The red-eye detector 34 should be fast. Detection speed may be enhanced by noticing that it may not be necessary to compute the entire sum of the weak classifier responses:

$$f(X)=f_1(X)+f_2(X)+ \ldots +f_N(X) \qquad \text{(equation 5)}$$

at each location. Many negative patterns can be rejected early, from just a few leading terms in that sum. To implement this early rejection, a set of thresholds $\theta_1, \theta_2, \ldots, \theta_N$ is computed, such that a pattern X is classified as positive if not only f(X)>0 but also, for each i, the ith partial sum:

$$f_1(X)+ \ldots +f_i(X) \geq \theta_i. \qquad \text{(equation 6)}$$

These intermediate thresholds are computed by considering a large number of positive examples, selecting those that are correctly classified (i.e., those for which f(X)>0), and computing:

$$\theta_i = \min_X(f_1(X)+ \ldots +f_i(X)). \qquad \text{(equation 7)}$$

Thus, if a face example X is correctly classified, then for each i we have:

$$f_1(X) + \ldots + f_i(X) \geq \theta_i. \quad \text{(equation 8)}$$

The system according to this implementation of the present invention considers each candidate image window X and computes the responses of the weak classifiers $f_1(X)$, $f_2(X)$, ... in order, maintaining the cumulative response $s = f_1(X) + f_2(X) + \ldots + f_i(X)$, for $i = 1 \ldots N$. If $s \geq \theta_i$, proceed with the evaluation of $f(X)$; otherwise, abandon this candidate and move on to the next one. This allows most negative examples to be quickly eliminated.

There are several ways to compute the intermediate thresholds $\theta_1, \theta_2, \ldots, \theta_N$. For example, in addition to the technique described above, the system can determine, in advance, the fraction $r_K$ of positive examples that will be rejected by the first K intermediate thresholds, for each $K = 1 \ldots N$. For instance, the system can set:

$$r_K = R \cdot (K/N), \quad \text{(equation 9)}$$

where R is the false negative rate of the overall classifier (determined in advance). Then, the false rejection rate of the first K stages of the classifier increases linearly with K, finally reaching R when K=N. The thresholds can be computed by analyzing a large number of positive training examples, and computing the thresholds $\theta_1, \ldots, \theta_N$ one by one. $\theta_K$ is found by computing the intermediate classifier response $$f_1(X) + \ldots + f_{K-1}(X) \quad \text{(equation 10)}$$

for each example X, setting the response to $-\infty$ if the example is rejected by any of the thresholds $\theta_1 \ldots \theta_{K-1}$. Then, $\theta_K$ is chosen so that the fraction of responses that are below $\theta_K$ is $r_K$.

In the above, it was assumed that the order of weak classifiers in equation (5) is fixed. However, in addition to determining the intermediate thresholds, the system can decide the order in which to apply the weak classifiers. As described above, the order of weak classifiers may be learned using boosting. As an alternative, the system could use the greedy search method to find the first weak classifier to use (and the corresponding threshold $\theta_1$) so as to maximize the number of rejected negative examples; the subsequent classifiers and thresholds being found similarly.

Figure 3B:
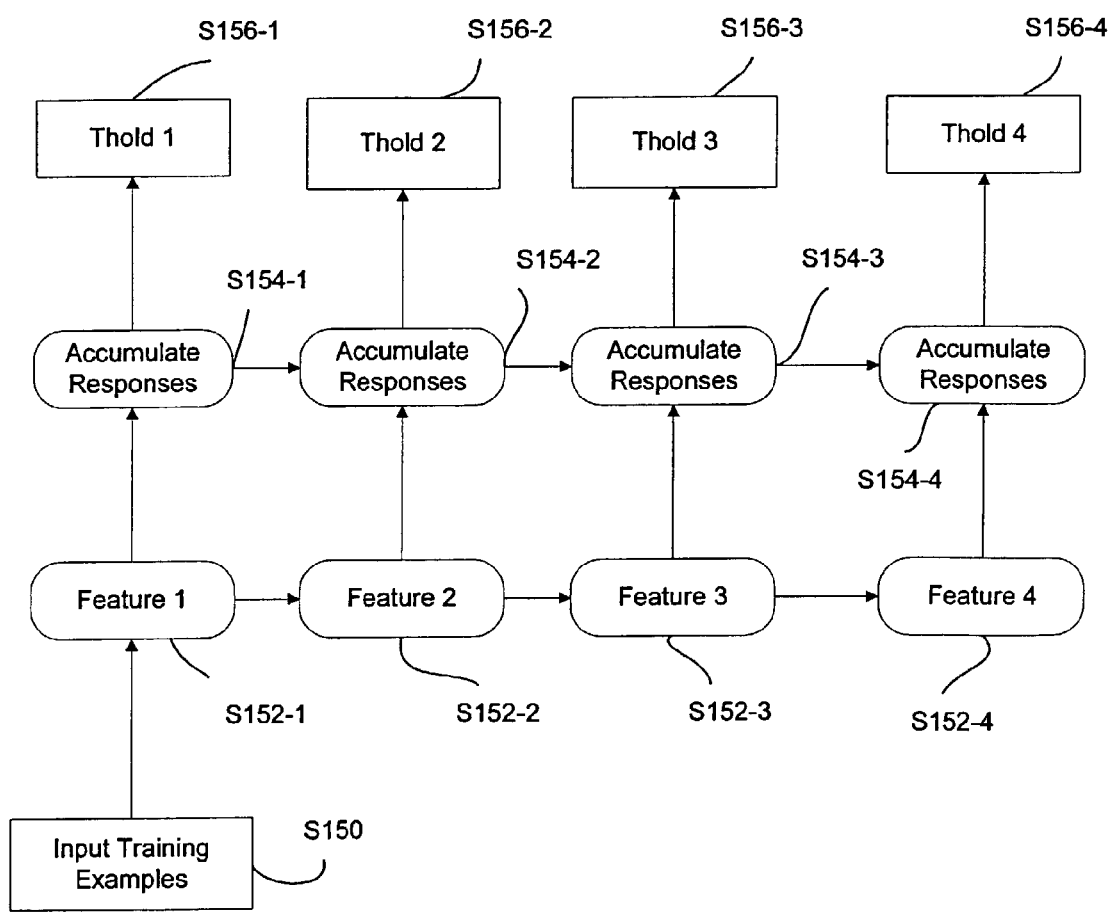
FIG. 3B illustrates a technique for creating intermediate thresholds for early rejection during classification according to an embodiment of the present invention.
Figure 3C:
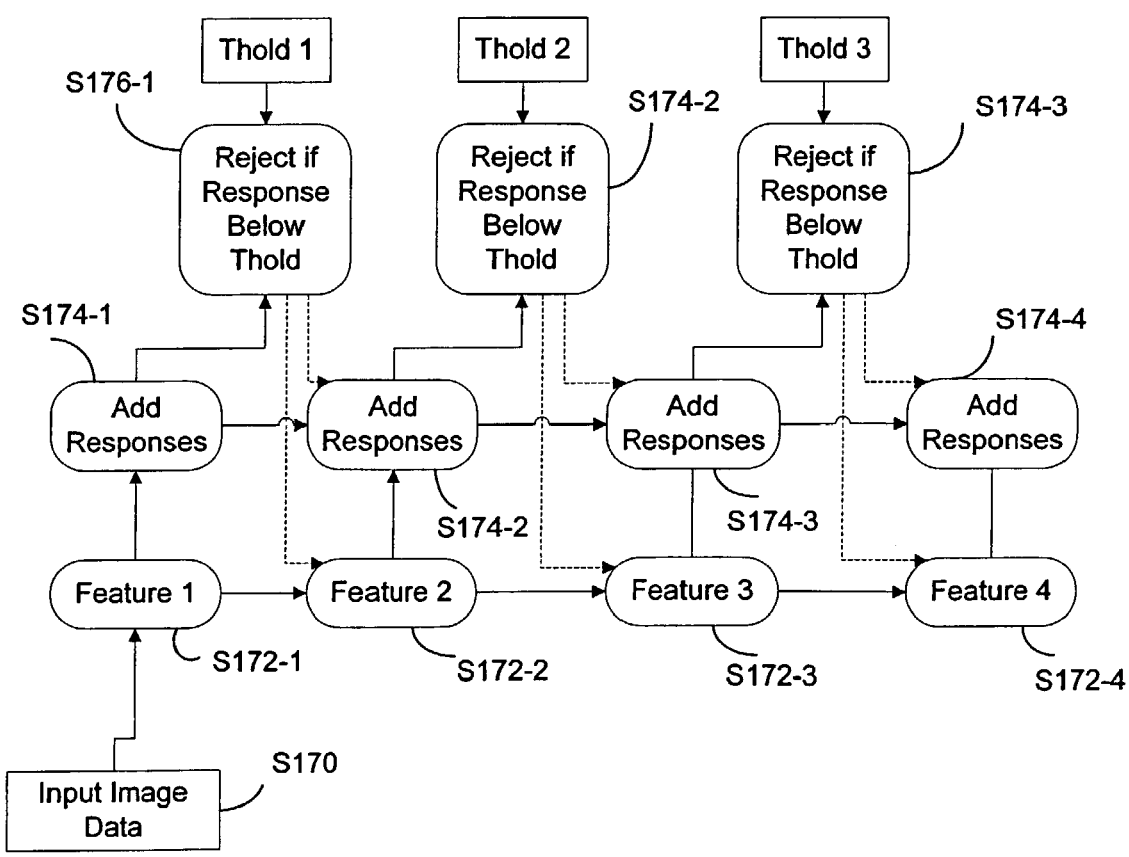
FIG. 3C illustrates a technique for applying intermediate thresholds for early rejection during classification according to an embodiment of the present invention.

FIG. 3B shows the flowchart for learning the intermediate thresholds in accordance with an implementation of the present invention. FIG. 3C shows how the intermediate thresholds may be used for early rejection. As shown in FIG. 3B, a plurality of training examples are input (S150), corresponding to red-eye regions of various size and non-red-eye regions, and a plurality of feature values, feature 1—feature 4 in the example of FIG. 3B, are successively calculated (S152-1, S152-2, S152-3, S152-4). As feature values are calculated for multiple training examples, an accumulated response is generated for each feature value (S154-1, S154-2, S154-3, S154-4) to calculate a plurality of intermediate thresholds (S156-1, S156-2, S156-3, S156-4), which can subsequently be used for early rejection.

FIG. 3C illustrates an exemplary implementation of using such intermediate thresholds. As shown in FIG. 3C, image data is input (S170) and a plurality of feature values, feature 1—feature 4 in the example of FIG. 3C, are successively calculated (S172-1, S172-2, S172-3, S172-4). A response value for the input image data is successively calculated based on calculated feature values (S174-1, S174-2, S174-3, S174-4), and compared to a threshold so that the input data is rejected as red-eye candidate if the accumulated response falls below the previously-calculated intermediate threshold (S176-1, S174-2, S174-3). In this way, the steps of calculating additional feature values for a particular image region may be avoided if an intermediate response value falls below an intermediate threshold.

Figure 4:
FIG. 4 illustrates an exemplary result of detecting the position of red-eye candidates according to implementation of the present invention.

FIG. 4 illustrates an exemplary result of the red-eye candidate detector 34, including a rectangle around remaining red-eye candidates. As shown in FIG. 4, the red-eye candidate detector may include false-positives, such as lights having a hue/shape that may be confused with the red-eye region. In accordance with the present invention, the face detector 36 eliminates such false positives included in the set of red-eye candidates output by the red-eye candidate detector 34.

Figure 5:
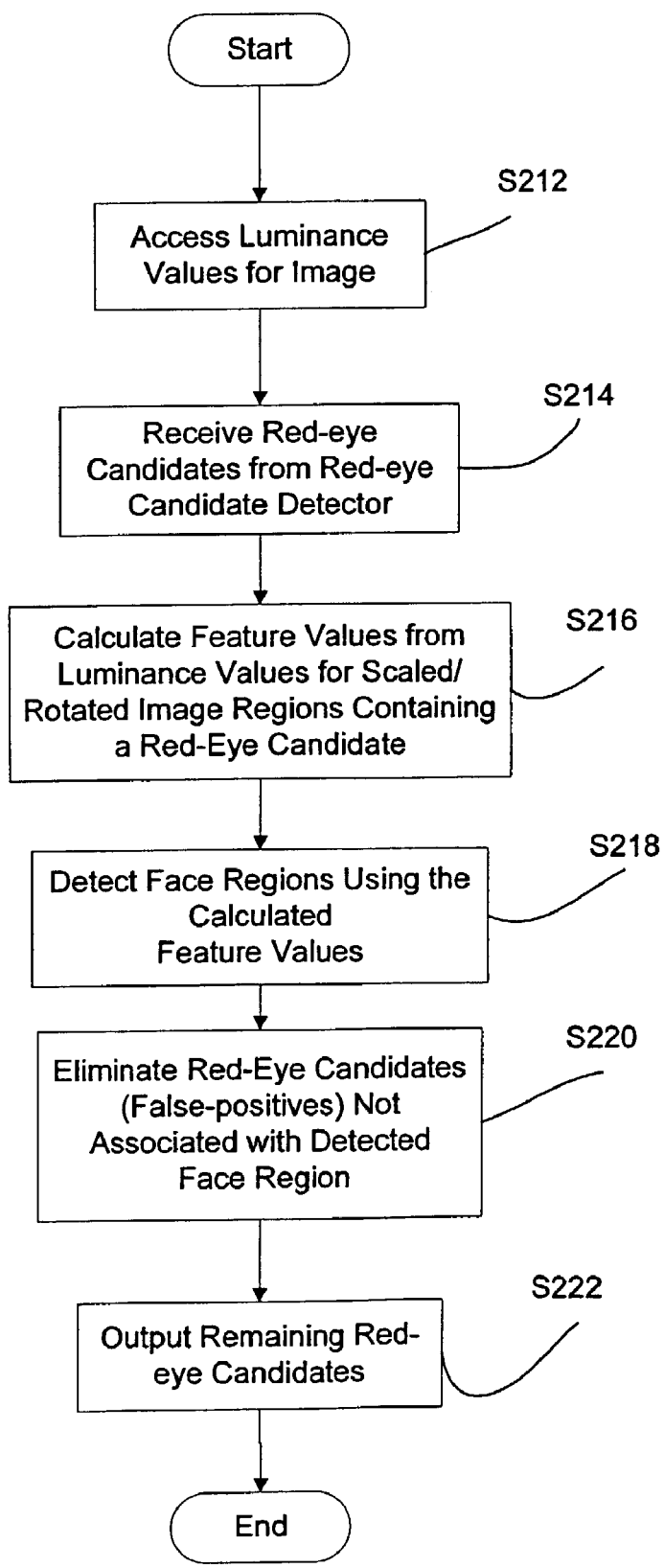
FIG. 5 is a flow diagram illustrating operations performed by a face detection unit for eliminating red-eye candidates not associated with a detected face region according to an embodiment of the present invention.

FIG. 5 is a flow diagram illustrating operations performed by the face detector 36 in accordance with an embodiment of the present invention. The above-described techniques for training and early rejection may also be applied to face detection. The face detector 36 eliminates false positives by eliminating red-eye candidates not associated with a face. To achieve this, the face detector 36 accesses image data from the image memory 32 (S212) and receives red-eye candidates (position, scale) from the red-eye candidate detector 34 (S214). In accordance with one implementation of the present invention, the face detector 36 only utilizes luminance values, Y, to perform face detection. Therefore, if the image data provided by the image memory 32 is RGB data, the face detector 36 transforms such data into a color space that includes the luminance, Y, channel for each pixel. Next, the face detector 36 calculates feature values for scaled/rotated image regions containing a red-eye candidate as indicated by the red-eye candidate detector 34 (S216), such calculated feature values being compared to a threshold to identify the corresponding image patch as a face region or a non-face region (S218). The face detector 36 is able to eliminate red-eye candidates not associated with a detected face region (S220), and outputs the remaining red-eye candidates (S222).

In accordance with one implementation of the present invention, images for face detection are represented with quantized wavelet coefficients of the image luminance. In particular, the face detector 36 may compute the Discrete Wavelet Transform (DWT) of the luminance using a 5/3 filter bank, and keep only the HL and LH bands at 3 levels of decomposition (that is, using the responses to horizontal and vertical bar filters at 3 scales). Face detection using DWT coefficients is known and described in H. Schneiderman et al., "A statistical method for 3d object detection applied to faces and cars," in *IEEE Conf. on Computer Vision and Pattern Recognition*, 2000, pp. 746-51. The wavelet coefficients may be contrast-normalized using local image variance and quantized to 7 levels each. Each feature used for face detection may be a combination of 4 quantized DWT coefficients. Therefore, each candidate face image may be represented with a set of discrete features.

In practice, the red-eye detection is faster (i.e., less computationally intensive) than face detection. This is because the red-eyes (i) can be represented using smaller patches as compared to faces (e.g., 11×11 pixels for eyes vs. 31×28 pixels for faces), and (ii) are rotation invariant, and also more scale invariant than faces. This means that, for red-eyes, a single orientation of the image and scales spaced by a factor of 2 may be considered, whereas, for faces, 4 or 12 rotations of the image and scales spaced by a factor of 1.2 may be considered. Therefore, applying red-eye detection before face detection, and considering a candidate face only if a red-eye was detected nearby, significantly improves detection speed. As with the red-eye detection discussed above, the face detector 36 may be trained, using a set of positive images containing faces and negative images without faces.

Figure 6:
FIG. 6 illustrates an exemplary output for the face detection unit according to an embodiment of the present invention.

FIG. 6 illustrates an exemplary output of the face detector 36, which, as compared to FIG. 4, has eliminated the false positives generated by the red-eye candidate detector 34.

Having obtained a list of detected faces and red-eye positions/scales, it is desirable to accurately identify red-eye pixels that should be subjected to subsequent processing by the red-eye reduction module 39 while excluding pixels associated with adjacent regions (e.g., the eyelids, etc.). Thus, the red-eye outline/pixel detector 38 accurately determines the outline for the identified red-eye regions associated with a face and pixels within the detected outline.

Figure 7:
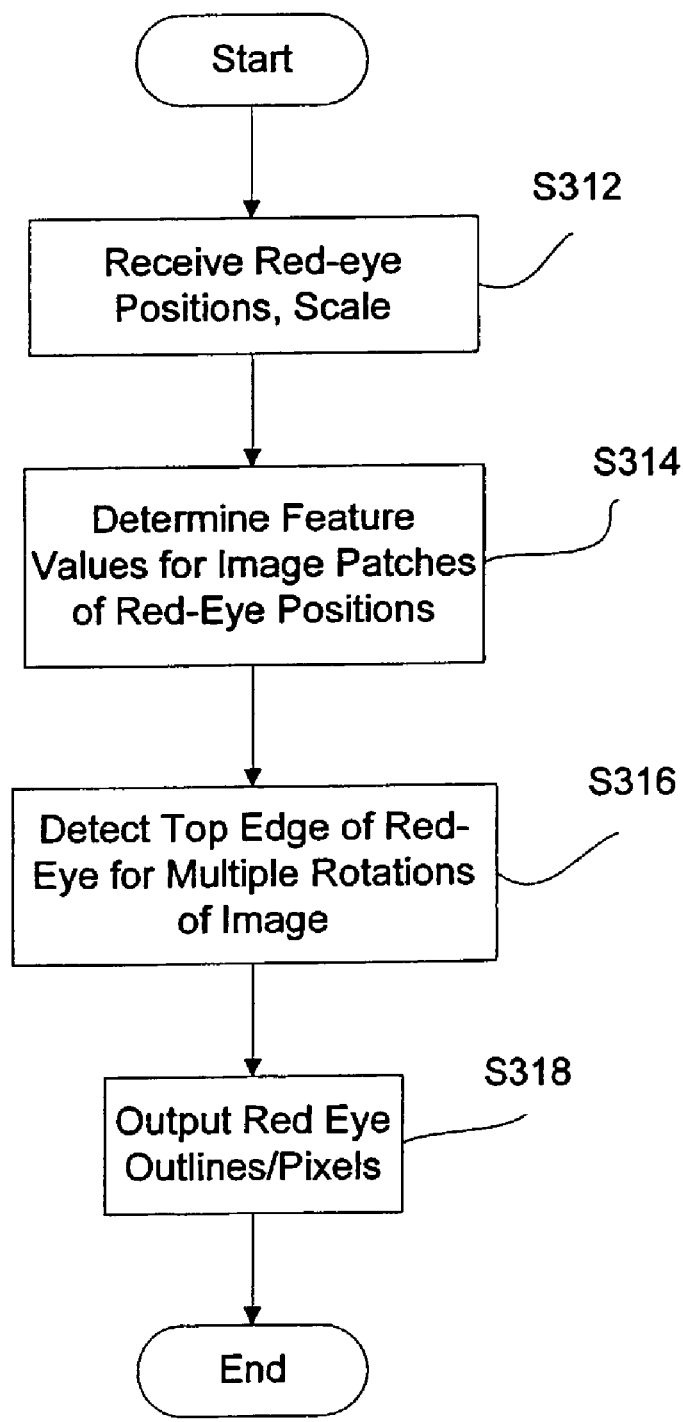
FIG. 7 is a flow diagram illustrating operations of a red-eye outline detection unit according to an embodiment of the present invention.

FIG. 7 is a flow diagram illustrating operations performed by the red-eye outline/pixel detector 38 according to an embodiment of the present invention. The red-eye outline/pixel detector 38 initially receives red-eye positions, scale information from the face detector 36 (S312), and accesses image data from image memory 32. Next, the red-eye outline/pixel detector 38 calculates feature values for the identified red-eye image patches (S314). In comparison to the operation performed by the red-eye candidate detector 34, which identifies the center of a red-eye candidate, the red-eye outline/pixel detector 38 may be trained to respond to the edges of the red-eye region. In particular, the red-eye outline/pixel detector 38 is trained in accordance with an embodiment of the present invention to respond to the top edge of the red-eye, such that the top edge of the red-eye is detected from multiple rotations of the red-eye image patch (S316).

The edge detector may be trained in a way identical to the red-eye detector 34, except for the geometric normalization of positive training examples. In other words, the same feature types may be used. When training the red-eye detector 34, the training red-eye examples were centered at the center of the image patch. Training the edge detector 38, each red-eye is rotated by a random angle and the uppermost point of the rotated red-eye is placed at the center of the image patch, thus ensuring that the detector is anchored to the edge rather than the center of the red-eye.

Figure 8:
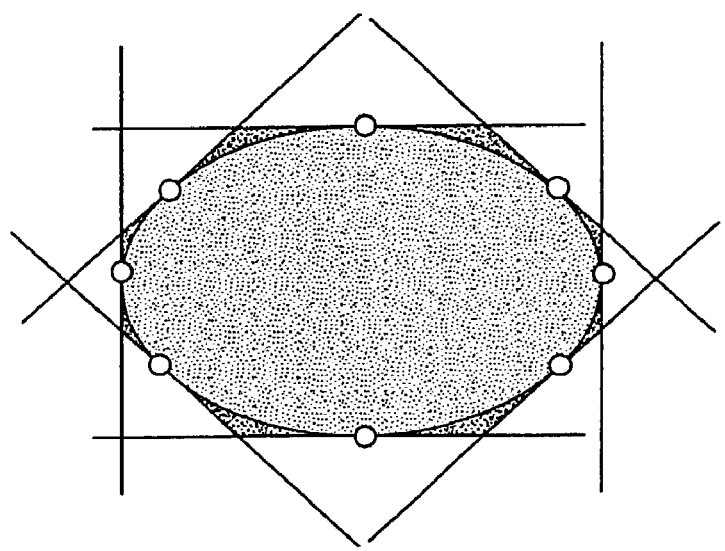
FIG. 8 illustrates aspects of the operation for detecting a red-eye outline according to the operations illustrated in the flow diagram of FIG. 7.

By applying top-edge detection to 8 rotations of the image (by multiples of 45°) and intersecting the 8 half-planes induced by each edge (as shown in FIG. 8), the red-eye outline is detected and the red-eye pixels within the outline are output (S318). It should be recognized that fewer rotations (e.g., 6, 4, or 3 rotations) or a greater number of rotations may be used. In addition to separating red-eye pixels from surrounding pixels, the red-eye outline/pixel detector 38 may be used to eliminate additional false positives, e.g., based on a geometric analysis of the detected outline. For example, if the aspect ratio of the outline is not close to 1, the identified red-eye may be eliminated because red-eyes may be expected to be roughly circular in shape.

Figure 9:
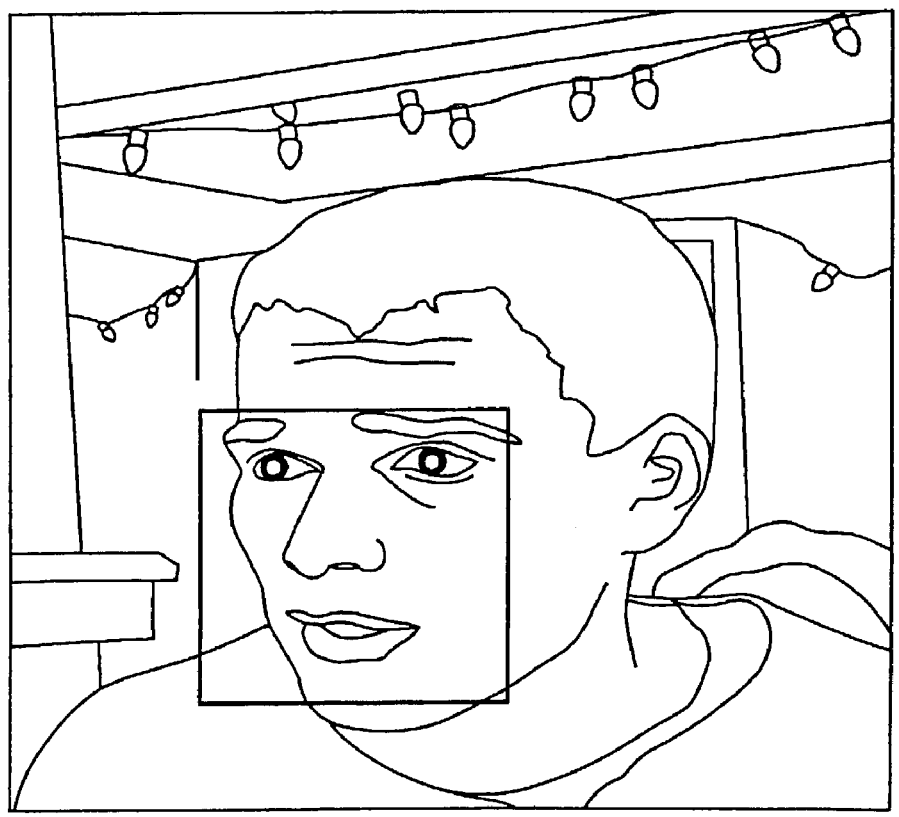
FIG. 9 illustrates an exemplary output of the red-eye outline detection unit according to an embodiment of the present invention.

FIG. 9 illustrates an exemplary output of the red-eye outline/pixel detector 38. Having accurately identified red-eyes and separated red-eye pixels from surrounding pixels using outline detection, the red-eye reduction module 39 may be incorporated to change the identified pixels within the red-eye outline to a more natural color. In this process, the red-eye reduction module 39 may choose a different color for different pixels or may substitute red-eye pixels with a predetermined value.

Figure 10:
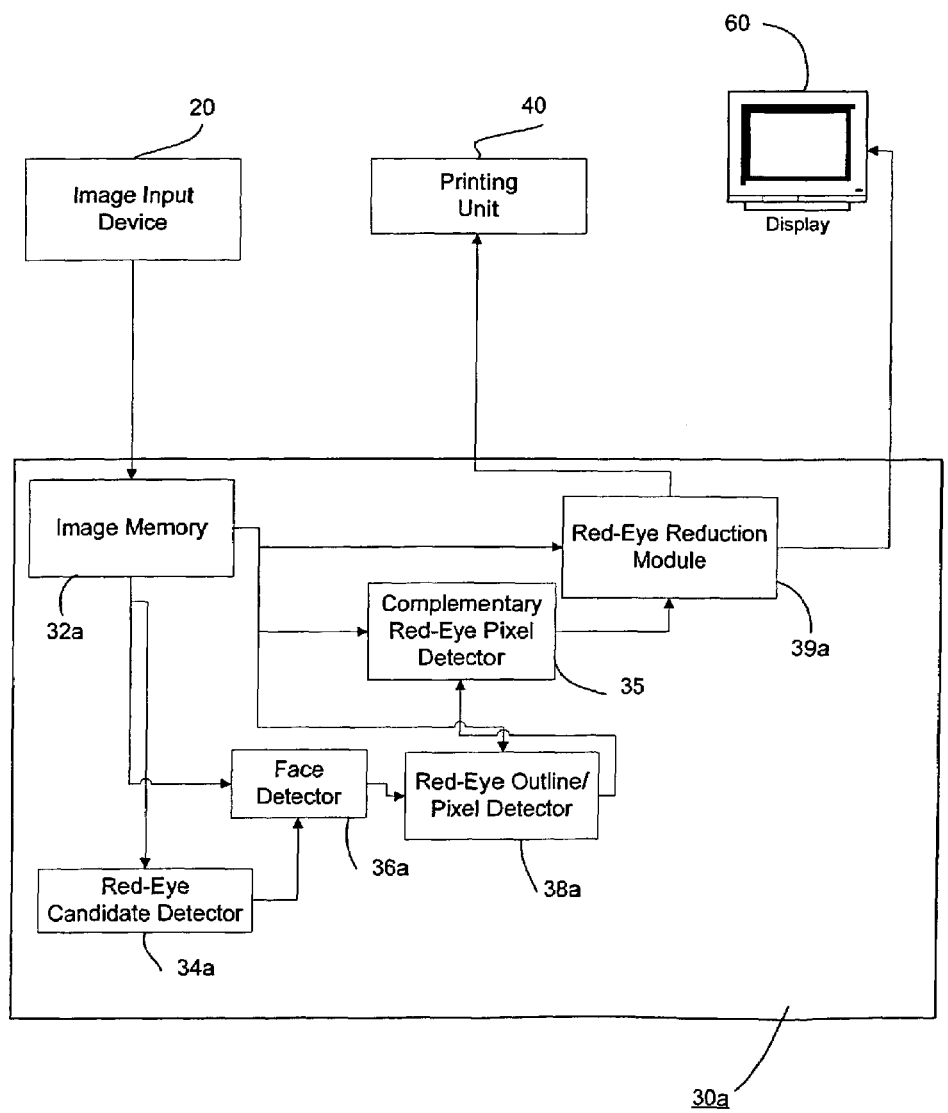
FIG. 10 is a block diagram illustrating an alternative implementation for the image processing unit for the system illustrated in FIG. 1.

FIG. 10 is a block diagram illustrating components of an image processing unit 30a in accordance with a second embodiment of the present invention. As shown in FIG. 10, the image processing unit 36 includes the following elements: an image memory 32a; a red-eye candidate detector 34a; a face detector 36a; a red-eye outline/pixel detector 38a; a red-eye reduction module 39a; and a complementary red-eye pixel detector 35. In accordance with this second embodiment of the present invention, the red-eye candidate detector 34a, the face detector 36a, and the red-eye outline/pixel detector 38a may function in like manner to the corresponding elements of the first embodiment. In accordance with the second embodiment illustrated in FIG. 10, the complementary red-eye pixel detector 35 further performs red-eye pixel detection, the results of which can be combined with the output of the red-eye outline/pixel detector 38a to more accurately indicate pixels that should be subject to red-eye reduction processing by the red-eye reduction module 39a.

Figure 11:
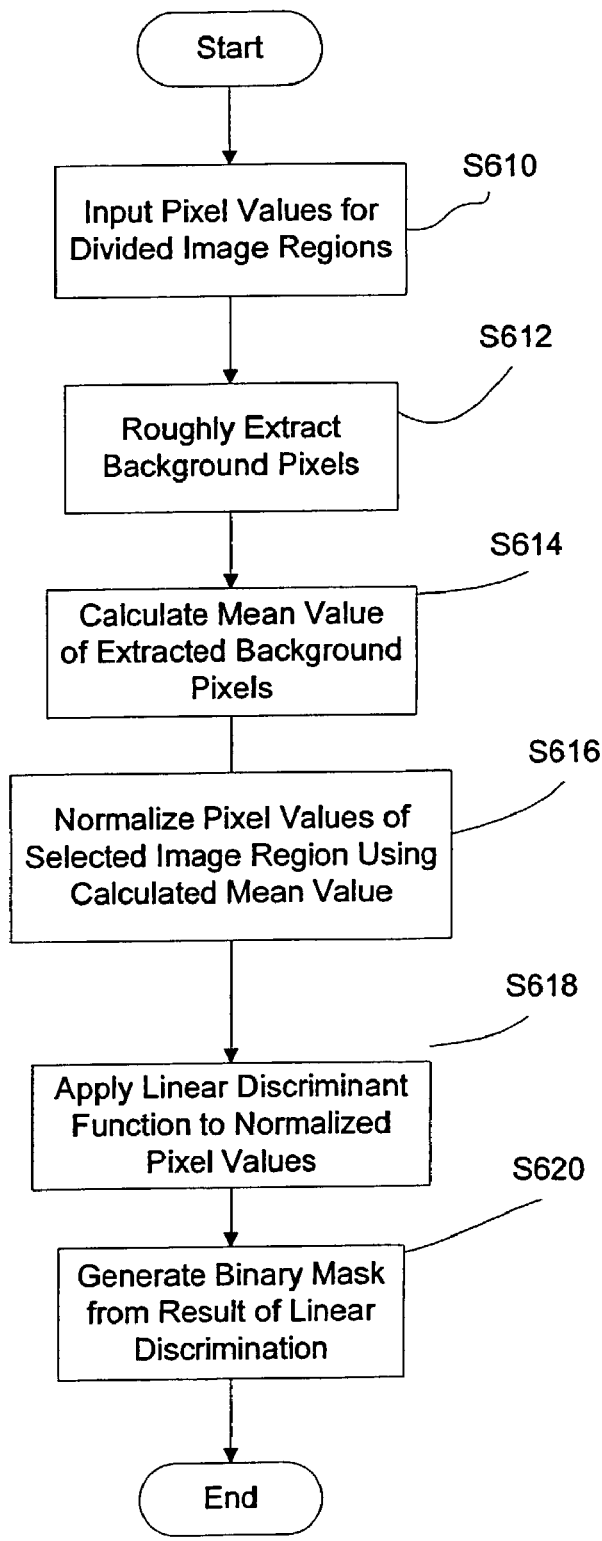
FIG. 11 is a flow diagram illustrating operations performed by the complementary red-eye pixel detector in accordance with an implementation of the present invention.

FIG. 11 is a flow diagram illustrating operations performed by the complementary red-eye pixel detector 35 in accordance with an implementation of the present invention. The complementary red-eye pixel detector 35 effectively distinguishes red-eye pixels from surrounding pixels by converting image data into a color channel, Cr*, specifically designed to maximize differences between the red-eye pixels and surrounding pixels. With reference to the flow diagram of FIG. 11, the complementary red-eye pixel detector 35 accesses image data from the image memory 32a (S610), which is subsequently processed by dividing the image into regions. Depending on lighting conditions, etc., the object of interest (i.e., a red-eye) and background regions may span a similar range of colors. To avoid the need for manually designing an effective separation measure between the red-eye pixels and background pixels, the second embodiment of the present application automatically determines a feature to separate red-eye pixels from background pixels using training examples. During this training operation, object pixels of the input image are known. For every object pixel, a sample is generated by normalizing its value by the background in the same image. Normalizing may be achieved by subtracting the mean value of the background from the object pixel. Alternatively, the object pixel value may be divided by the mean of the background.

Next, the normalized sample values are applied to a linear discriminant function, the Fisher linear discriminant according to an implementation of the present invention, thereby resulting a measure f that takes as input a normalized sample value and returns a value which reflects the confidence that the normalized sample value came from a red-eye. The linear discriminant in this implementation has the form:

$$f(x)=w^*x \qquad \text{(equation 11)}$$

The vector w is fixed and is computed via the known Fisher method from the normalized training samples x:

$$w=\text{inverse}(S)+\text{mean}(x) \qquad \text{(equation 12)}$$

S is the (mean normalized) covariance matrix of x. Once f has been determined, the complementary red-eye pixel detector 35 normalizes each pixel value and applies f. When examining a pixel x, the pixel x is normalized based on the mean value of a neighborhood of x, such a neighborhood being designed so as to exclude most object pixels. Preferably, the neighborhood is designed so that the range of colors in the neighborhood is coherent and as distinct as possible from the pixels of interest. For example, for red-eyes, the neighborhood can be the annulus around the red-eye area, which is expected to contain primarily skin.

The end result of the complementary red-eye pixel detector 35 is a binary mask, identifying the red-eye pixels (S620). The output of the complementary red-eye pixel detector 35 may be combined with the output of the red-eye outline/pixel detector 38a (as shown in the embodiment of FIG. 10) to improve detection accuracy. Furthermore, the color channel utilized by the complementary red-eye pixel detector 35 may be utilized by the red-eye candidate detector to improve detection therein and may be used as a pre-processing to reject uninteresting areas because it is fast to compute.

Figure 12A:
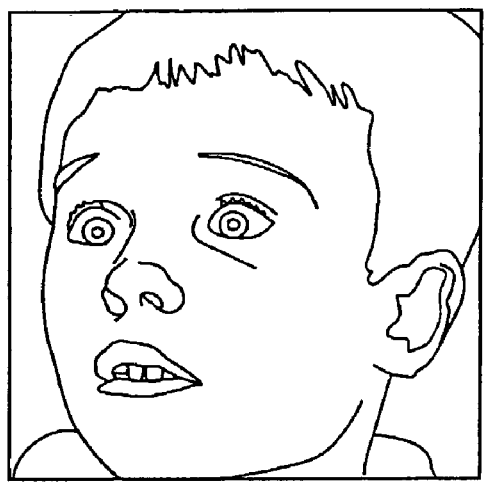
FIG. 12A illustrates an exemplary red-eye condition.
Figure 12B:
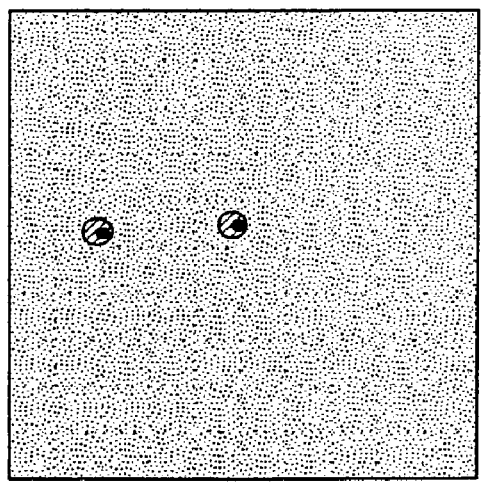
FIG. 12B illustrates an exemplary output of the red-eye pixel detection performed in accordance with the embodiment of the present invention illustrated in FIG. 10.

FIG. 12A illustrates an example of a red-eye condition input to the complementary red-eye pixel detector 35, and FIG. 12B illustrates an exemplary binary mask (the hatched region representing red-eye pixels) output by the complementary red-eye pixel detector 35. One advantage of the complementary red-eye pixel detector 35 seen from FIG. 12B is that interior portions of the eye that are not negatively affected by the red-eye condition are separated from the surrounding red-eye portion, such that non-affected pixels within the eye are not subject to subsequent red-eye reduction, thus preserving a natural appearance in the end result.

Although detailed embodiments and implementations of the present invention have been described above, it should be apparent that various modifications are possible without departing from the spirit and scope of the present invention.

We claim:

1. A method of automatically detecting red-eye regions in a photographic image, said method comprising:
    accessing digital image data representing a color photographic image;
    detecting red-eye candidate regions in said photographic image by processing said digital image data, said step of detecting red-eye candidate regions including
        calculating feature values for multiple positions of said photographic image, and
        identifying red-eye candidate regions based on said calculated feature values resulting from said calculating step; and
    performing face detection to determine whether an identified red-eye candidate region is associated with a face, said step of performing face detection including
        calculating feature values for face detection to distinguish faces from non-faces, for an image region associated with an identified red-eye candidate region, and
        determining whether said identified red-eye candidate region is associated with a face based on said feature values for face detection.

2. The method of automatically detecting red-eye regions in a photographic image as recited in claim 1, further comprising:
    detecting an outline for each identified red-eye candidate region associated with a face.

3. The method of automatically detecting red-eye regions in a photographic image as recited in claim 2, further comprising:
    generating a red-eye detection mask identifying red-eye candidate pixels in said photographic image, including converting image data of said color photographic image into a color channel with increased contrast between object pixels and local background pixels; and
    combining results of said step of generating a red-eye detection mask and said step of detecting an outline to identify pixels in said digital image data to be subjected to red-eye reduction.

4. The method of automatically detecting red-eye regions in a photographic image as recited in claim 2, wherein said step of detecting an outline for an identified red-eye candidate region detects a top red-eye edge for multiple rotations of the corresponding image region.

5. The method of automatically detecting red-eye regions in a photographic image as recited in claim 1, further comprising:
    generating a red-eye detection mask identifying red-eye candidate pixels in said photographic image, including converting image data of said color photographic image into a color channel with increased contrast between object pixels and local background pixels.

6. The method of automatically detecting red-eye regions in a photographic image as recited in claim 1, wherein said sub-step of calculating feature values for multiple positions of said photographic image includes converting image data of said color photographic image into a color channel with increased contrast between object pixels and local background pixels.

7. The method of automatically detecting red-eye regions in a photographic image as recited in claim 1, wherein said sub-step of calculating feature values for multiple positions of said photographic image calculates feature values from Y, Cb, and Cr image data.

8. The method of automatically detecting red-eye regions in a photographic image as recited in claim 1, wherein said sub-step of calculating feature values for multiple positions of said photographic image is performed by scanning photographic image data using a window of fixed size and repeating said scanning for scaled versions of said photographic image, such that said step of detecting red-eye candidate regions identifies red-eye candidate regions of various sizes.

9. The method of automatically detecting red-eye regions in a photographic image as recited in claim 1, wherein said sub-step of calculating feature values calculates a plurality of weak classifiers.

10. The method of automatically detecting red-eye regions in a photographic image as recited in claim 1, wherein said step of performing face detection computes discrete wavelet transform coefficients to distinguish faces from non-faces.

11. The method of automatically detecting red-eye regions in a photographic image as recited in claim 1, wherein
    said step of detecting red-eye candidate regions generates a set of red-eye candidate regions, and
    said step of performing face detection eliminates candidates from said set of red-eye candidate regions found to not be associated with a face.

12. The method of automatically detecting red-eye regions in a photographic image as recited in claim 1, wherein said sub-step of calculating feature values for face detection to distinguish faces from non-faces, for an image region associated with an identified red-eye candidate region calculates feature values from luminance image data.

13. A apparatus for automatically detecting red-eye regions in a photographic image, said apparatus comprising:
    an image data unit for providing digital image data representing a color photographic image;
    a red-eye candidate detecting unit for detecting red-eye candidate regions in said photographic image by processing said digital image data, said red-eye candidate detecting unit detecting red-eye candidate regions by calculating feature values for multiple positions of said photographic image, and identifying red-eye candidate regions based on said calculated feature values; and a face detection unit for performing face detection to determine whether a detected red-eye candidate region is associated with a face, said face detection unit calculating feature values for face detection to distinguish faces from non-faces, for an image region associated with a detected red-eye candidate region, and determining whether said detected red-eye candidate region is associated with a face based on said feature values for face detection.

14. The apparatus according to claim 13, further comprising:

a red-eye outline detection unit for detecting an outline for each identified red-eye candidate region associated with a face.

15. The apparatus according to claim 14, further comprising:

a complementary red-eye detecting unit for generating a red-eye detection mask identifying red-eye candidate pixels in said photographic image, said complementary red-eye pixel detecting unit converting image data of said color photographic image into a color channel with increased contrast between object pixels and local background pixels, wherein the output of said complementary red-eye detecting unit is combined with the out of said red-eye outline detection unit to identify pixels in said digital image data to be subjected to red-eye reduction.

16. The apparatus according to 14, wherein said red-eye outline detection unit detects a top red-eye edge for multiple rotations of the corresponding image region.

17. The apparatus according to claim 13, further comprising:

a complementary red-eye pixel detecting unit for generating a red-eye detection mask identifying red-eye candidate pixels in said photographic image, said complementary red-eye pixel detecting unit converting image data of said color photographic image into a color channel with increased contrast between object pixels and local background pixels.

18. The apparatus according to claim 13, wherein said red-eye candidate detection unit converts image data of said color photographic image into a color channel with increased contrast between object pixels and local background pixels.

19. The apparatus according to claim 13, wherein said red-eye candidate detection unit calculates feature values from Y, Cb, and Cr image data.

20. The apparatus according to claim 13, wherein said red-eye detection unit scans photographic image data using a window of fixed size and repeats said scanning for scaled versions of said photographic image, thereby detecting red-eye candidate regions of various sizes.

21. The apparatus according to claim 13, wherein said red-eye detection unit calculates said feature values as a plurality of weak classifiers.

22. The apparatus according to claim 13, wherein said face detection unit computes discrete wavelet transform coefficients to distinguish faces from non-faces.

23. The apparatus according to claim 13, wherein said red-eye candidate detection unit generates a set of red-eye candidate regions, and said face detection unit performs face detection to eliminate candidates from said set of red-eye candidate regions found to not be associated with a face.

24. The apparatus according to claim 13, wherein said red-eye candidate detection unit iteratively compares a response value, calculated as a combination of feature values, for an image region to intermediate threshold values to achieve early rejection of image regions not associated with a red-eye.

25. The apparatus according to claim 24, wherein said intermediate threshold values are obtained through a training session, using sample images of red-eye and non-red-eye image regions, of various size and orientation.

26. The apparatus according to claim 13, wherein said face detection unit iteratively compares a face detection response value for an image region to intermediate threshold value to achieve early rejection of image regions not associated with a face.

27. The apparatus according to claim 26, wherein said intermediate threshold values are obtained through a training session, using sample images of face and non-face regions, of various size and orientation.

28. The apparatus according to claim 13, wherein said face detection unit calculates feature values for face detection from luminance image data.

29. A method of detecting red-eye pixels in a photographic image, said method comprising:

accessing digital image data representing a color photographic image;

normalizing each of a plurality of pixels of said digital image data based on pixels in the neighborhood of the pixel being normalized;

applying a linear discriminant function to the normalized pixels; and determining whether each of a plurality of normalized pixels is a red-eye pixel or not based on the result of applying the linear discriminant function.

30. The method according to claim 29, wherein said step of normalizing normalizes each of the plurality of pixels based on a mean value of neighborhood pixels.

31. The method according to claim 30, wherein said step of normalizing subtracts the mean value of neighborhood pixels from the pixel being normalized.

32. The method according to claim 30, wherein said step of normalizing divides a value of the pixel being normalized by the mean value of neighborhood pixels.

33. The method according to claim 29, wherein said step linear discriminant function is a Fisher linear discriminant function.

34. An apparatus for detecting red-eye pixels in a photographic image, said apparatus comprising:

an image data input for providing digital image data representing a color photographic image; and a red-eye pixel detecting unit for detecting red-eye pixels by normalizing each of a plurality of pixels of said digital image data based on pixels in the neighborhood of the pixel being normalized;

applying a linear discriminant function to the normalized pixels; and determining whether each of a plurality of normalized pixels is a red-eye pixel or not based on the result of applying the linear discriminant function.

35. The apparatus according to claim 34, wherein said red-eye pixel detecting unit normalizes each of the plurality of pixels based on a mean value of neighborhood pixels.

36. The apparatus according to claim 35, wherein said red-eye pixel detecting unit normalizes pixels by subtracting the mean value of neighborhood pixels from the pixel being normalized.

37. The apparatus according to claim 35, wherein said red-eye pixel detecting unit normalizes pixels by dividing a value of the pixel being normalized by the mean value of neighborhood pixels.

38. The apparatus according to claim 34, wherein said step linear discriminant function is a Fisher linear discriminant function.

\* \* \* \* \*